(12) United States Patent
Oberheim

(10) Patent No.: US 8,407,901 B2
(45) Date of Patent: Apr. 2, 2013

(54) DRIVE MECHANISM FOR A RECIPROCATING TOOL

(75) Inventor: Stephen C. Oberheim, Des Plaines, IL (US)

(73) Assignee: Robert Bosch GmbH, Stuttgart (DE)

(*) Notice: Subject to any disclaimer, the term of this patent is extended or adjusted under 35 U.S.C. 154(b) by 577 days.

(21) Appl. No.: 12/694,858

(22) Filed: Jan. 27, 2010

(65) Prior Publication Data

US 2010/0126028 A1    May 27, 2010

Related U.S. Application Data

(63) Continuation-in-part of application No. 12/256,912, filed on Oct. 23, 2008, now Pat. No. 8,230,608.

(51) Int. Cl.
*B27B 3/12* (2006.01)
*B27B 19/09* (2006.01)

(52) U.S. Cl. .............................. 30/393; 74/25
(58) Field of Classification Search ............ 30/393, 30/392, 394, 501–503, 208–214, 503.5, 220–226; 74/50, 55, 56, 57, 58; 173/176; 464/182
See application file for complete search history.

(56) References Cited

U.S. PATENT DOCUMENTS

| | | |
|---|---|---|
| 2,619,131 A | 11/1952 | Vulliet-Durand |
| 2,793,661 A | 5/1957 | Olson |
| 4,038,721 A | 8/1977 | Kendzior |
| 4,238,884 A | 12/1980 | Walton, II |
| 4,550,501 A | 11/1985 | Moores, Jr. et al. |
| 5,450,925 A | 9/1995 | Smith et al. |
| 5,555,626 A | 9/1996 | Fuchs |
| 6,234,255 B1 | 5/2001 | Feldmann et al. |
| 6,249,979 B1 | 6/2001 | Bednar et al. |
| 6,282,797 B1 | 9/2001 | Osada et al. |
| 6,508,151 B1 | 1/2003 | Neitzell |
| 6,634,107 B2 | 10/2003 | Osada |
| 6,662,455 B2 | 12/2003 | Tachibana et al. |
| 6,742,267 B2 | 6/2004 | Marinkovich et al. |
| 6,758,119 B1 | 7/2004 | Neitzell |
| 6,829,831 B1 | 12/2004 | Neitzell |
| 7,096,590 B2* | 8/2006 | Marinkovich et al. .......... 30/392 |
| 7,117,601 B2 | 10/2006 | Hai-Chun |
| 7,181,850 B2 | 2/2007 | Tachibana et al. |
| 7,188,425 B2 | 3/2007 | Bednar et al. |
| 7,350,302 B2 | 4/2008 | Imai et al. |
| 2004/0040162 A1 | 3/2004 | Osada |
| 2005/0178012 A1* | 8/2005 | Neitzell et al. .................. 30/392 |
| 2005/0262710 A1* | 12/2005 | Moreno ......................... 30/394 |
| 2008/0189961 A1 | 8/2008 | Oberheim |

* cited by examiner

*Primary Examiner* — Ghassem Alie
(74) *Attorney, Agent, or Firm* — Maginot, Moore & Beck

(57) ABSTRACT

A drive apparatus for a reciprocating tool includes a plunger and a wobble plate interface operatively connected to a drive shaft assembly. The wobble plate interface includes a lower portion having an effective lower pivot connection, and an upper pivot connection to a rear portion of the plunger. The wobble plate interface is configured to reciprocate the plunger generally in its lengthwise direction during alternating cutting and return strokes. The distances between the upper and lower pivot connections of both the rocker and wobble plate interface together with the distance between the upper pivot connections thereof to the plunger define a four bar mechanism that produces a path of movement of an attached cutting blade that is effective to apply a progressive non-linear cutting force to a work piece during the cutting stroke.

15 Claims, 10 Drawing Sheets

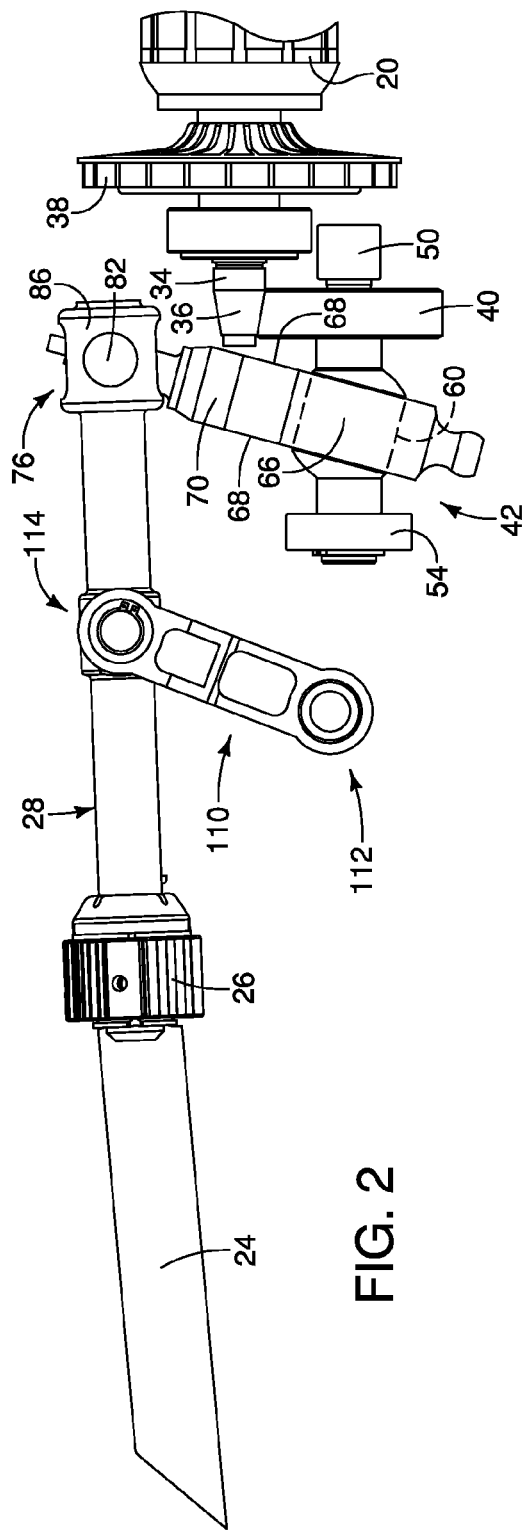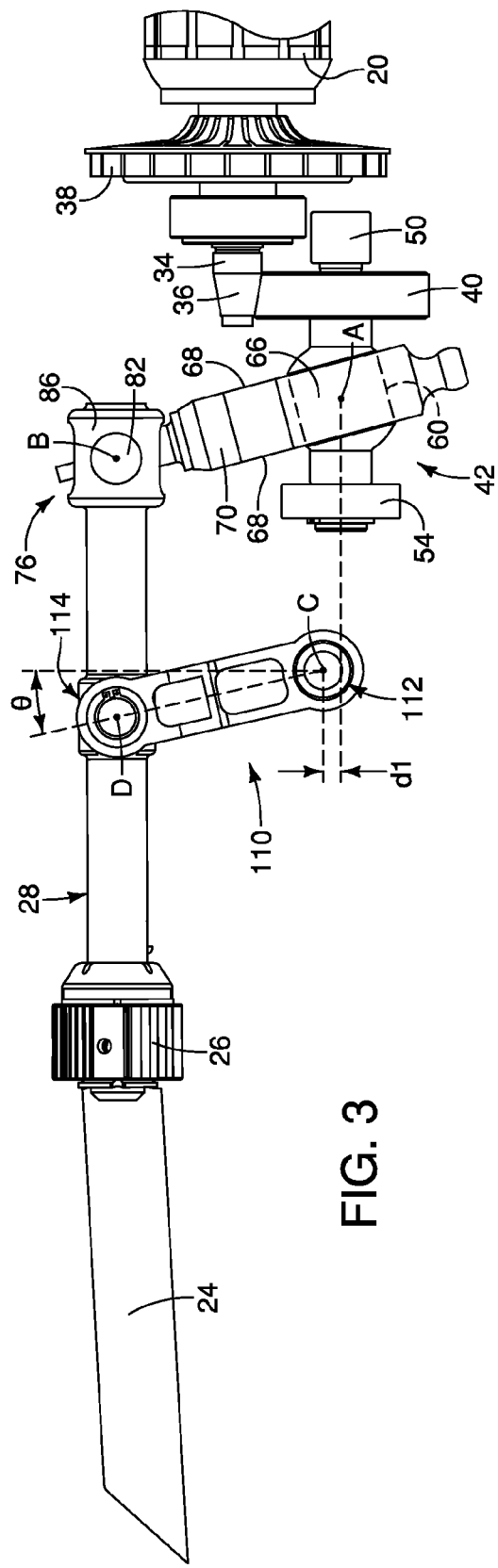
FIG. 2
FIG. 3

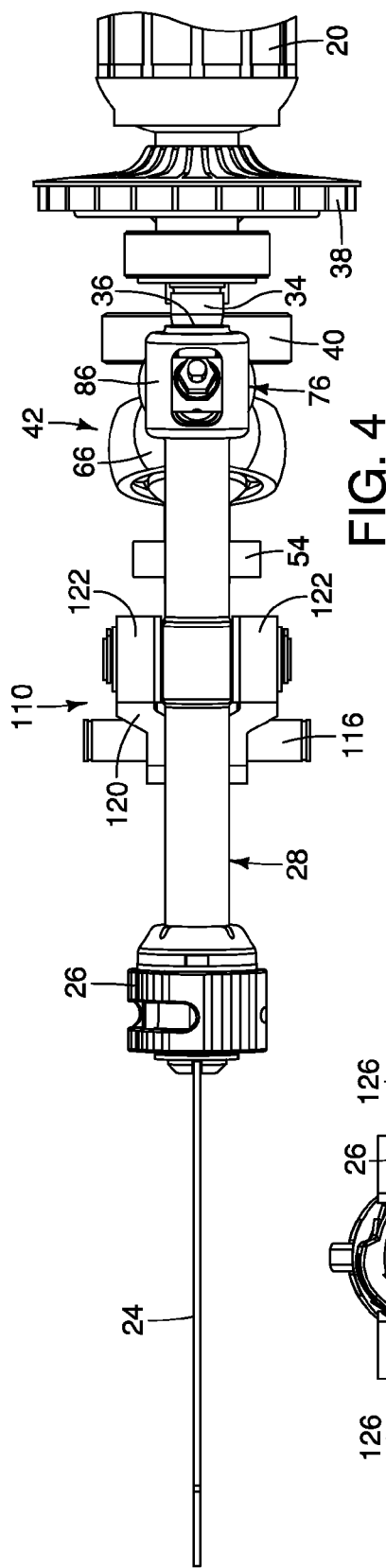
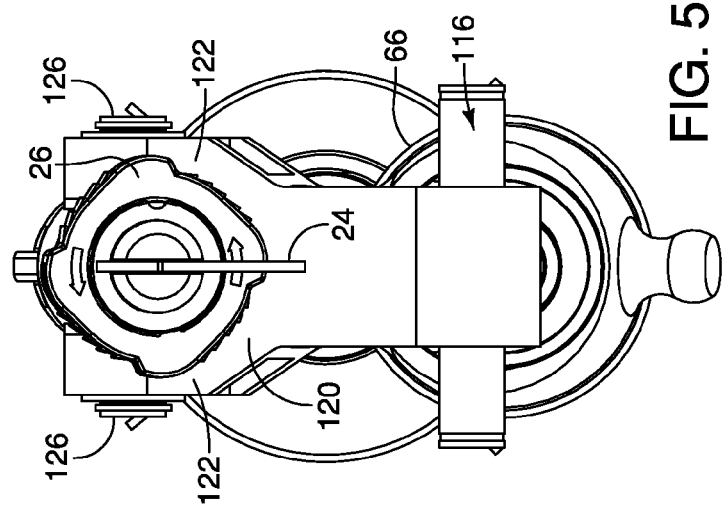

US 8,407,901 B2

DRIVE MECHANISM FOR A RECIPROCATING TOOL

This is a continuation in part of application Ser. No. 12/256,912, filed Oct. 23, 2008.

BACKGROUND OF THE INVENTION

The present invention generally relates to power hand tools, and more particularly, to power reciprocating tools.

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner.

Reciprocating tools such as jigsaws, saber saws, as well as larger reciprocating saws are typically driven by the rotating output shaft of an electric motor. Such tools have a mechanism that translates rotary motion of the output shaft into reciprocating motion. Among the types of mechanisms that convert the rotary motion to reciprocating motion includes a wobble plate drive mechanism that is well known to those of ordinary skill in the art.

There has been much research and development over the years in attempting to improve the cutting efficiency of such reciprocating saws and this has been achieved by introducing an orbital path of movement for the blade as it performs its cutting stroke as well as its return stroke. Such orbital as have the effect of increasing the force that is applied to the blade during its cutting operation. The amount of orbital action can often be varied by manipulation of a control mechanism associated with the tool, so that efficient cutting can be done. The adjustment of the amount of orbital action or variation of the cut path can be made to more efficiently cut both hard and soft materials. It is generally known that existing orbit systems work better in soft materials than they do in hard materials. For this reason, saws are provided with orbit on-off switches. Knowing when to turn the orbital action on or off and remembering to do so can lead to confusion by users.

Existing orbit mechanisms create a motion path that is related to the position of the plunger. The position of the plunger or plunger rod can be described as being fully forward, fully back or at mid-stroke in general. All existing orbit mechanisms cause the blade to start moving into the work piece at the start of a cut stroke and move away from or out of the work piece during the return stroke. The amount of incremental orbit motion in typical commercially marketed orbit systems is nearly constant during the entire cut stroke and the return stroke. The orbit path also can be said to be nearly symmetrical with respect to the cutting and return strokes.

These conventional orbit systems work well when cutting soft materials such as wood. However, when cutting hard materials such as steel, pipe or steel plate, saws with conventional orbit systems have significant drawbacks. Conventional orbit mechanisms apply orbital action at the start of a cut stroke. The orbital action often causes the blade to bounce on the material at the beginning of the cut stroke which delays good establishment of the blade teeth in the material for a portion of the cut stroke thereby reducing cutting effectiveness.

Mechanisms that can create substantial nonlinear orbit paths for aggressive orbit paths and end strokes with conventional orbit drive systems have often experienced significant mechanical limitations. These are typically cam systems that have linear motion which is basically symmetric about a mid-stroke position, with the cut stroke being one near linear path and the return stroke as another near linear path. These two paths are offset from each other by a small amount.

To date, no known attempts been made to create asymmetric or to create highly nonlinear paths. Attempts have been made to create a more aggressive orbit using cam drives. However, this results in very high cam follower loads which create high friction and wear in the cam elements. Another wear problem that occurs when the cam is aggressively shaped is that the cam follower can lift off of the cam. This produces a lack of contact between the cam and the cam follower for a major portion of the cam rotation. This is called cam float and is a common problem in high-speed cams. Floating results in loss of the force pushing the blade into the work piece. In especially aggressive cams, it can require several revolutions of the cam before the follower comes back down into contact with it. The loss of cam to cam follower contact then leads to the loss of contact force between the saw blade and the work piece and reduces the cutting rate instead of increases it.

There have been cam systems developed where the orbit actuation cycle of down and up is shared by two cams. However, having aggressively shaped cams is expensive because of the necessity of matching two cam profiles with a high degree of precision and the attendant wear problem still exists. Similar problems of high forces arising with aggressive orbits arise when trying to use adjustable angled slots with their associated slot followers. The forces that are experienced can be very high, even if the track is straight and too much orbital action will lead to high forces on the track follower. Since much of the action of a track follower involves sliding, high friction and wear are also a problem.

SUMMARY OF THE INVENTION

A first preferred embodiment of the present invention is a drive apparatus for a reciprocating tool, that comprises a housing, a rotatable drive shaft assembly located in the housing, an elongated plunger located in the housing for reciprocating motion, the plunger having a front end portion for attaching a cutting blade thereto, a rotary joint elongated rocker having a lower end portion with a lower pivot connection to the housing and an upper end with an upper pivot connection to a mid portion of the plunger, a wobble plate interface operatively connected to the drive shaft assembly, a lower portion having an effective lower pivot connection, the interface also having an upper pivot connection to a rear portion of the plunger and configured to reciprocate the plunger generally in its lengthwise direction during alternating cutting and return strokes, the distances between the upper and lower pivot connections of both the rocker and wobble plate interface together with the distance between the upper pivot connections thereof to the plunger defining a four bar mechanism that produces a path of movement of an attached cutting blade that is effective to apply a progressive non-linear cutting force to a work piece during the cutting stroke.

A second preferred embodiment includes a counterweight having a main portion that extends above and on opposite sides of the plunger and side portions that extend downwardly to said counterweight pivot connections and a support configuration associated with the counterweight and housing for supporting the counterweight while permitting reciprocating movement of the counterweight in said housing in a direction generally parallel to the plunger movement, said support configuration comprising a pair of spaced apart elongated rods oriented in a direction parallel to said lengthwise direction of the plunger and mounted in the housing, the counterweight having apertures in said side portions thereof in which the rods are inserted, the counterweight being movable relative to the rods.

DESCRIPTION OF THE DRAWINGS

FIG. 2 is a plan view of the drive mechanism shown in the embodiment of FIG. 1, shown in a position at the end of a cutting stroke;

FIG. 3 is a plan view of the drive mechanism shown in the embodiment of FIG. 1, shown in a position at the beginning of a cutting stroke;

FIG. 4 is a top view of the drive mechanism shown in FIG. 2;

FIG. 5 is a front in view of the drive mechanism shown in FIG. 3;

DETAILED DESCRIPTION

The preferred embodiments of the present invention are reciprocating drive mechanisms for a reciprocating tool such as a reciprocating saw, the general size and shape of which is similar to saws that are currently marketed. The present invention is also applicable for other types of tools such as saber saws, for example, or other types of tools that have a reciprocating action and are powered by a motor having a rotating output shaft.

A preferred embodiment of the present invention provides a reciprocating drive mechanism that utilizes a progressive nonlinear cut path as opposed to a traditional orbital path. The progressive cut path does this by using a nonlinear cut path that starts each cut with little contact force or a slightly negative contact force due to the blade lifting out of the work piece in which it is engaged and then applies a gradually increasing contact force through the cutting stroke. This prevents bouncing on hard materials at the beginning of the cut stroke and allows the blade teeth to establish good engagement with the material. Then the contact force is increased through the mid-stroke to approximately one third of its maximum value. Toward the end of the cutting stroke, as the plunger is slowing down as part of its sinusoidal cycle, the cut stroke is more aggressively increased to its full value. The aggressive increase of the cut stroke at the end of the cut stroke makes better use of a portion of the cutting cycle where there is usually a drop off in cutting due to the fact that the plunger is slowing down.

So this type of nonlinear path improves the action of the cutting stroke by reducing bouncing of the blade on the work piece at its beginning because it has very little contact force initially. Also, at the end of the cut stroke, embodiments of the present invention compensates for a slowing plunger with an aggressive cutting path.

The above operability is carried out using a drive mechanism that has far fewer parts and improved durability compared to existing mechanisms that provide orbital action. The progressive nonlinear motion is created by the action of a coupler link and a four bar mechanism that does not have any sliding interaction of components of the type which experiences wear and generates energy consuming heat.

Figure 1:
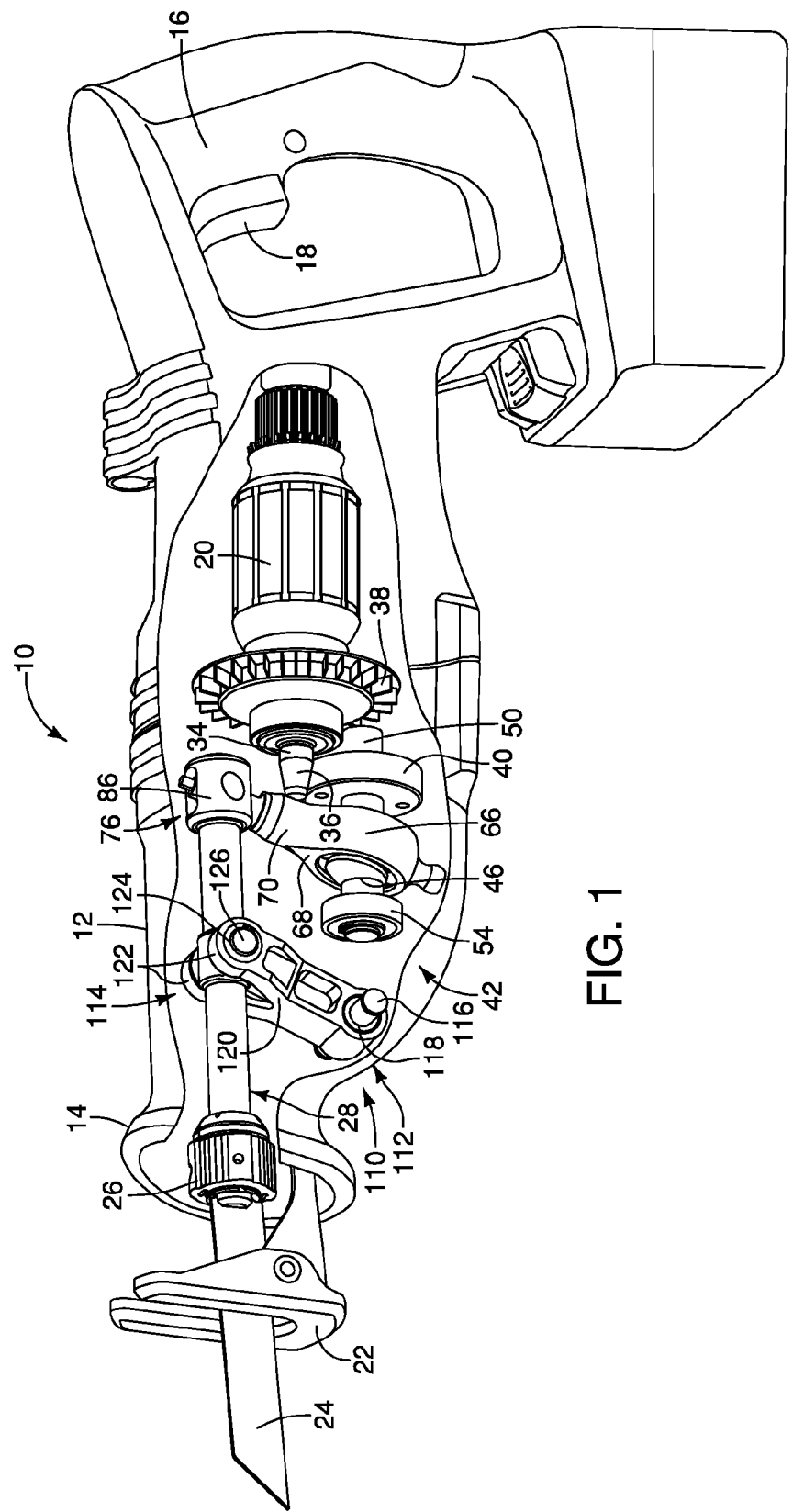
FIG. 1 is a perspective view of the preferred embodiment of the present invention, shown with portions removed to illustrate the drive mechanism.

Turning now to the drawings, and referring to FIG. 1, a reciprocating saw, indicated generally at 10, has a housing 12 which includes a nose portion 14 that is flared outwardly so that a user can hold the nose portion with one hand while holding a handle 16 with the other. A trigger switch 18 is provided in the handle portion 16 for turning on a motor 20 that drives the tool. The saw has a shoe 22 at the nose end portion 14 and a saw blade 24 is mounted in a blade clamping mechanism 26 that is mounted at the end of an elongated plunger, indicated generally at 28. As shown in FIGS. 1-4, the motor 20 has an output shaft 34 with a pinion gear 36 and fan member 38 operatively attached to the shaft 34, with the gear 36 engaging a larger gear 40 that is connected to a wobble plate assembly, indicated generally at 42, which drives the plunger 28 in a reciprocating manner. The teeth of the pinion gear 36 and gear 40 are not shown for the sake of simplicity, but are conventional as is known to those of ordinary skill in the art.

More particularly, the wobble shaft assembly 42 has a drive shaft, indicated generally at 46, to which the gear 40 is attached. The shaft has an end portion that is supported in a needle bearing 50 or the like and an opposite end supported in another ball bearing 54 that is mounted in the housing 12. It should be understood that the manner in which the motor 20, gears 36 and 40 as well as the shaft 46 are mounted in the housing 12 is not shown in detail inasmuch as such is conventional and is also well known to those of ordinary skill in the art.

With regard to the wobble plate assembly 42, for and referring to FIGS. 1-3, the shaft 46 has generally cylindrical shaped portion 60 shown in phantom in FIGS. 2 and 3 that is oriented at an acute angle relative to the axis of the shaft 46. The wobble plate assembly 42 has an elongated arm 66 that is mounted in ball bearings (not shown) for rotation relative to the cylindrical portion 60, which permits the arm 66 to move in a left and right direction relative to the cylindrical portion 60 as the shaft 46 is rotated during operation.

More particularly, as the shaft 46 is rotated, the angular orientation of the cylindrical portion 60 changes, and an arm 66 of the wobble plate assembly 42 is moved in a reciprocating manner, i.e., to the left as shown in FIG. 3, and to the right as shown in FIGS. 1 and 2. As is best shown in FIG. 1, the arm 66 has generally flat sides 68 that extend from the bottom upwardly which then merges into a curved outer end member 70 that reduces in size and becomes circular shaped in cross-section.

Figure 8:
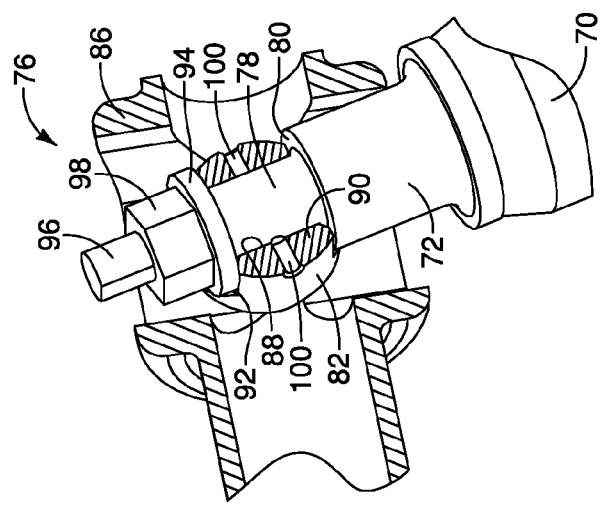
FIG. 8 is another perspective view of a portion of the drive mechanism, particularly illustrating another cross-section of the pivot connection shown in FIG. 6.
Figure 7:
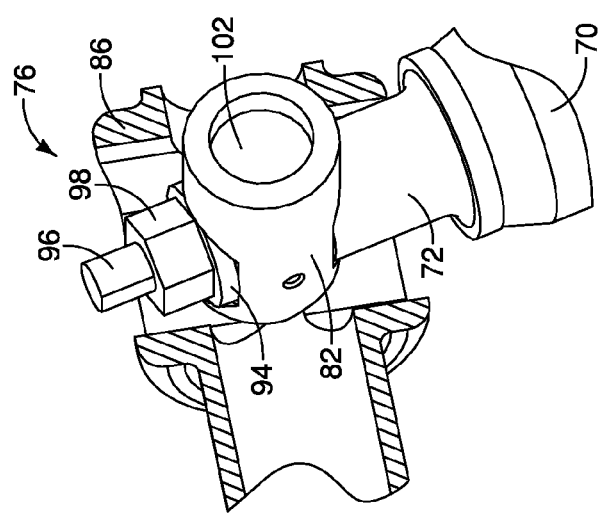
FIG. 7 is another perspective view of a portion of the drive mechanism, particularly illustrating a cross-section of the pivot connection shown in FIG. 6.
Figure 6:
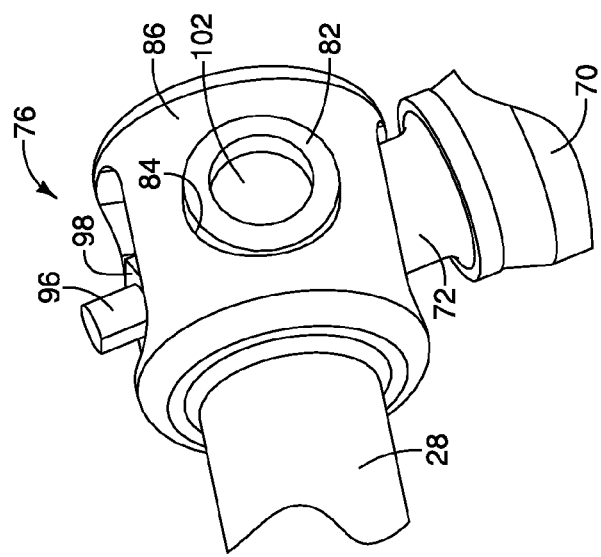
FIG. 6 is a perspective view of a portion of the drive mechanism, particularly illustrating the pivot connection of the wobble drive assembly and the plunger.

The end member 70 transitions into a cylindrical end portion 72 which connects to the plunger 28 by a pivot connection, indicated generally at 76, which is shown in FIGS. 6, 7 and 8, with FIGS. 7 and 8 being cross sections taken through the plunger 28 and portions of the pivot connection 76. The cylindrical portion 72 interfaces with a smaller diameter cylindrical portion 78 which forms an annular shoulder 80. A transverse cylindrical shaft 82 fits within an aperture 84 in the side walls of a receiver 86 that is formed or securely fixed to the rear end portion of the plunger 28. The receiver 86 also has a recess 87 that is vertically oriented in which the portions 72 and 78 can be inserted. The cylindrical shaft 82 is horizontally oriented and is configured to rotate in the aperture 84 during reciprocating motion of the plunger and arm 66 of the wobble plate assembly 42.

The cylindrical shaft 82 has a circular aperture 88 that is generally vertically oriented as shown in FIG. 8 and is sized to receive the cylindrical portion 78. The bottom of the cylindrical shaft 82 has a flat surface 90 which contacts the shoulder 80, and it also has an upper flat surface 92 that is configured to receive a washer 94, with the upper end 96 of the cylindrical portion 78 being threaded to receive a nut 98 thereon.

From the foregoing description, it should be appreciated that when the wobble plate assembly 42 reciprocates the arm 66 to the left and the right, the pivot connection 76 not only supports the rear end of the plunger 28, it enables the plunger to be driven by the wobble plate assembly 42 during operation. While not essential, small holes 100 may be provided for the purpose of introducing lubricating grease or the like into the cylindrical shaft 82 and its interface with the cylindrical portion 78. Also, while not essential, the opposite ends of the cylinder 82 may be formed or machined to provide a recess 102 for the purpose of reducing the weight of the cylinder 82.

The plunger 28 is also supported near its midpoint by an elongated rocker, indicated generally at 110, which has a lower pivot connection, indicated generally at 112, as well as an upper pivot connection, indicated generally at 114. The lower pivot connection 112 consists of a shaft 116 that is preferably secured in suitable recesses of the housing with the shaft 116 having needle bearings 118 enabling the low friction rotational movement of the elongated rocker. The rocker 112 has a split upper end 120 with two side portions 122, each of which has a needle bearing 124 in which a shaft 126 that is attached to the plunger 28 can rotate. It should be understood that the shaft 126 may actually be a unitary shaft that extends through the plunger 28, or there may be shaft portions which extend from each side of the plunger. In any event, the pivot connections enable the plunger to be reciprocated when driven by the wobble plate assembly 42. Referring particularly to FIG. 3, it has been provided with letter designations identifying the center point of pivot connections of the wobble plate assembly 42 and the front rocker 110. More particularly, the center of the pivot connection at the base of the wobble plate assembly is identified as A whereas the center of the pivot connection 76 is marked B. Similarly, the pivot connection 112 has its center marked C and the center of the upper pivot connection 114 is marked D. As is evident from the drawing, the center C is slightly above the center A by distance d1 has been marked on the drawing. Also, on FIG. 3, the rocker 110 is shown in its furthest left position which orients the rocker slightly forward by an angle θ relative to top dead center. It can be appreciated that if the mechanism is reciprocated to the right so that the rocker 110 is straight up, i.e., top dead center, the elevation of the cutting blade 24 will be at its maximum. When it is moved completely to the left as shown in FIG. 3, it is then going to be slightly lower than its top dead center elevation position. Similarly, if it is moved to the right as shown in FIG. 2, the elevation of the rocker point B will decrease and this displacement during a cutting and return stroke is shown in the chart on FIG. 9.

As is evident from the chart, the blade height of zero is defined as when it is in the position shown in FIG. 3. When it is moved to the right moved approximately 6 or 7 millimeters it will be at its top dead center position. The complete cutting stroke is approximately 28 millimeters. After it has moved through top dead center, it is progressively moved in a non-linear way so that the blade force is increased as the plunger is moved through its cutting stroke. In this regard, the cutting stroke is from the left to right as shown in FIGS. 1-3 and the return stroke follows the same path as the plunger is moved to the left.

Figure 9:
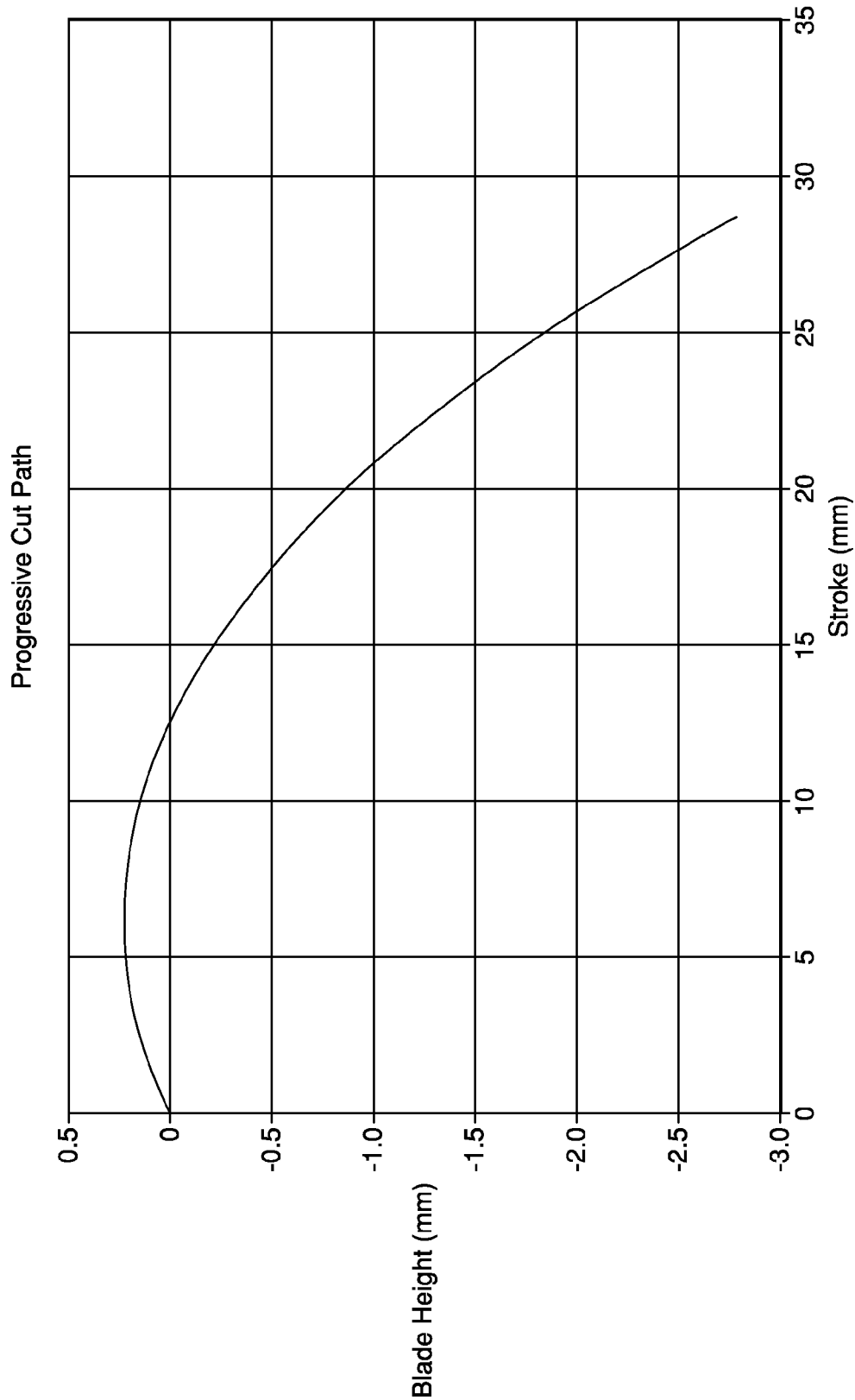
FIG. 9 is a chart of the nonlinear movement of the blade attached to the preferred embodiment of the present invention as it moves through its cutting stroke.

Since it moves through the path of movement as shown in FIG. 9, it is evident that it does not exhibit an orbital path of movement, but one that is nonlinear and progressive. The degree of progressiveness can be changed by the geometry of the mechanism. More particularly, if it is desired to have a less progressive cut, i.e., one which has a shallower path, such as moving from 0 through −1 millimeters, for example, this can be achieved by increasing the length of the rocker 110 so that the lower pivot point C is below the pivot point A of the wobble plate drive assembly. This can be done by modifying the configuration of the housing to lower the lower pivot connection 112.

It should also be understood that with the left-most position shown in FIG. 3 where the rocker is past top dead center, movement during the cutting stroke will cause the blade to lift relative to the initial rest position which will tend to counter the force of gravity that may otherwise result in bouncing of the blade off of the material being cut. It should be understood that changing the orientation of the lower pivot connection 112 more forwardly relative to the upper pivot connection 114 would enable the arc to start at top dead center and therefore not have the lifting characteristic as shown in FIG. 9. In that event, zero would be the start point and the blade height would generally extend downwardly in a curved manner with the amount of curvature being a function of the relative lengths of the rocker 110.

Second and third preferred embodiments are shown in FIGS. 10-14 which includes identical reference numbers for those components which are essentially the same as illustrated and described in the embodiment of FIGS. 1-8. Where they are similar but have slight variations, the same reference number with a prime 0 designator is often used. Where such components are not included in the first preferred embodiment, they will be given new reference numbers. It is also indicated that the second preferred embodiment shown in FIGS. 10-13 are similar to those of FIGS. 2, 3 and 4 inasmuch as they include the drive mechanism without the outer housing in which they are part of.

Figure 10:
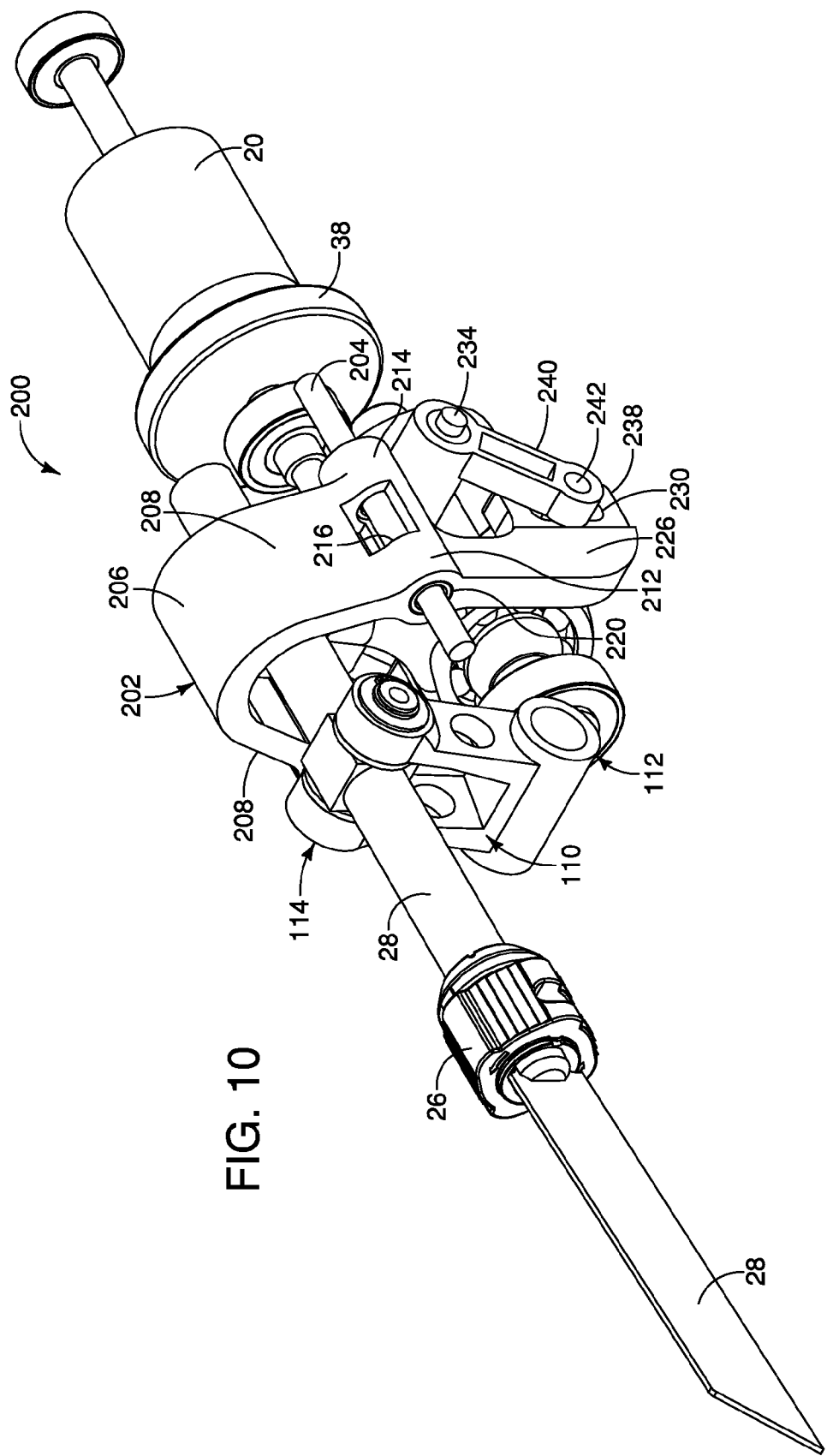
FIG. 10 is a perspective view of another preferred embodiment of the present invention, but shown without the outer housing to illustrate the drive mechanism including a counterweight.
Figure 11:
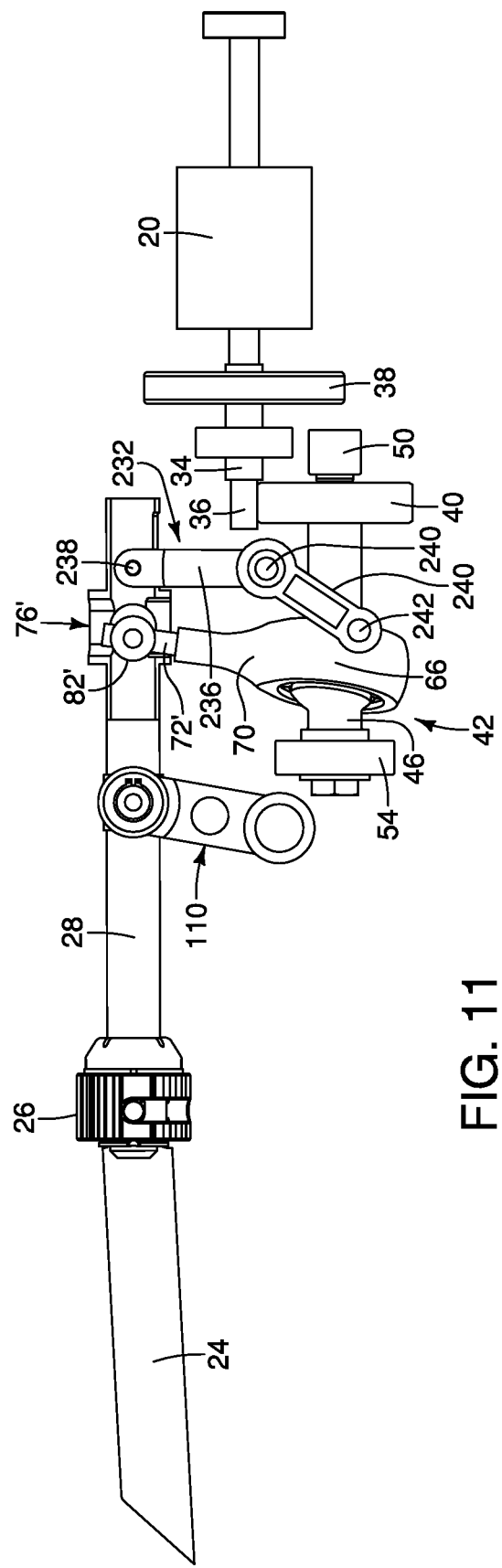
FIG. 11 is a side view of the apparatus shown in FIG. 10, with the counterweight and associated structure removed.
Figure 12:
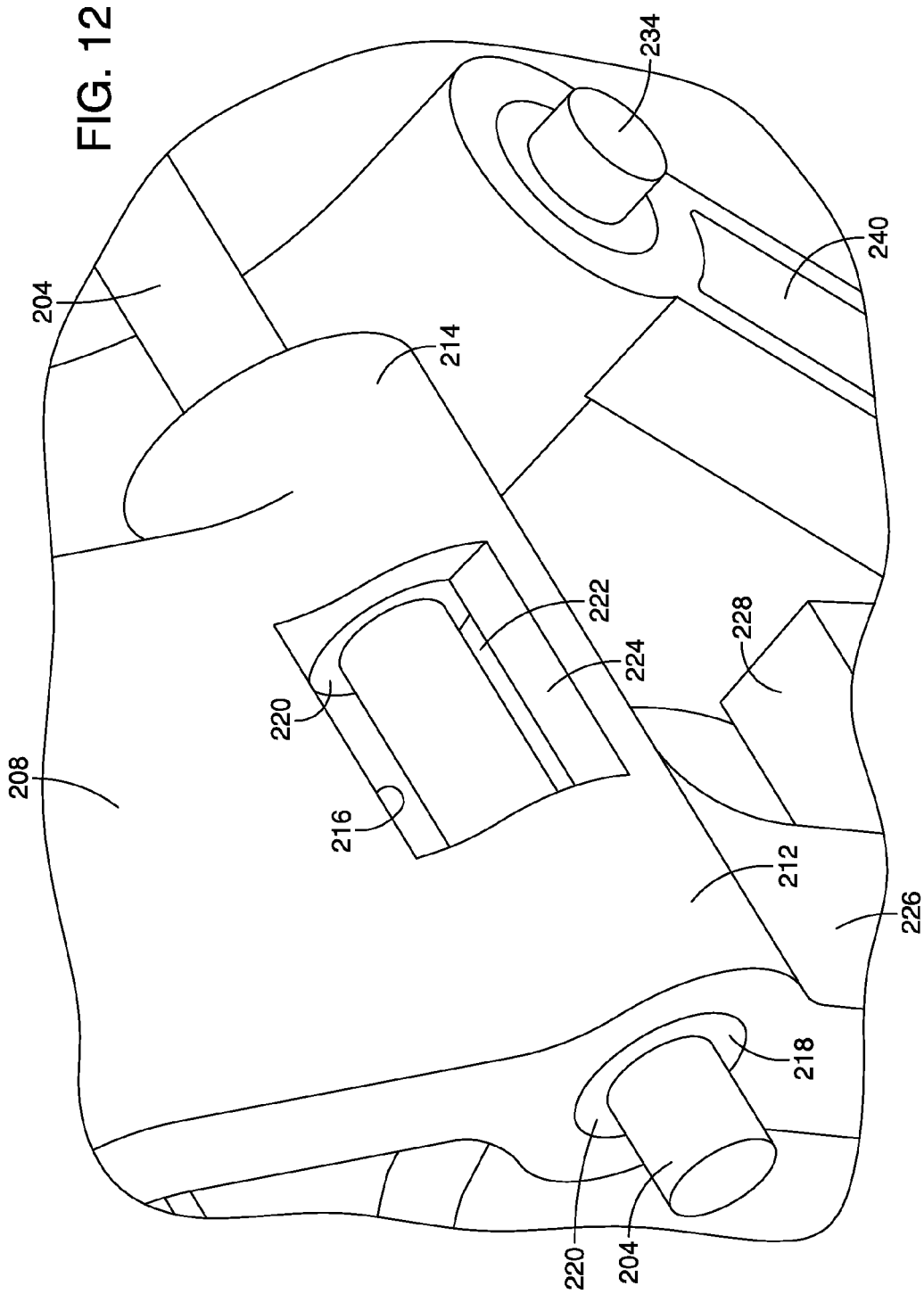
FIG. 12 is an enlarged view of a portion of the embodiment shown in FIG. 10, illustrating details of the counterweight mechanism.
Figure 13:
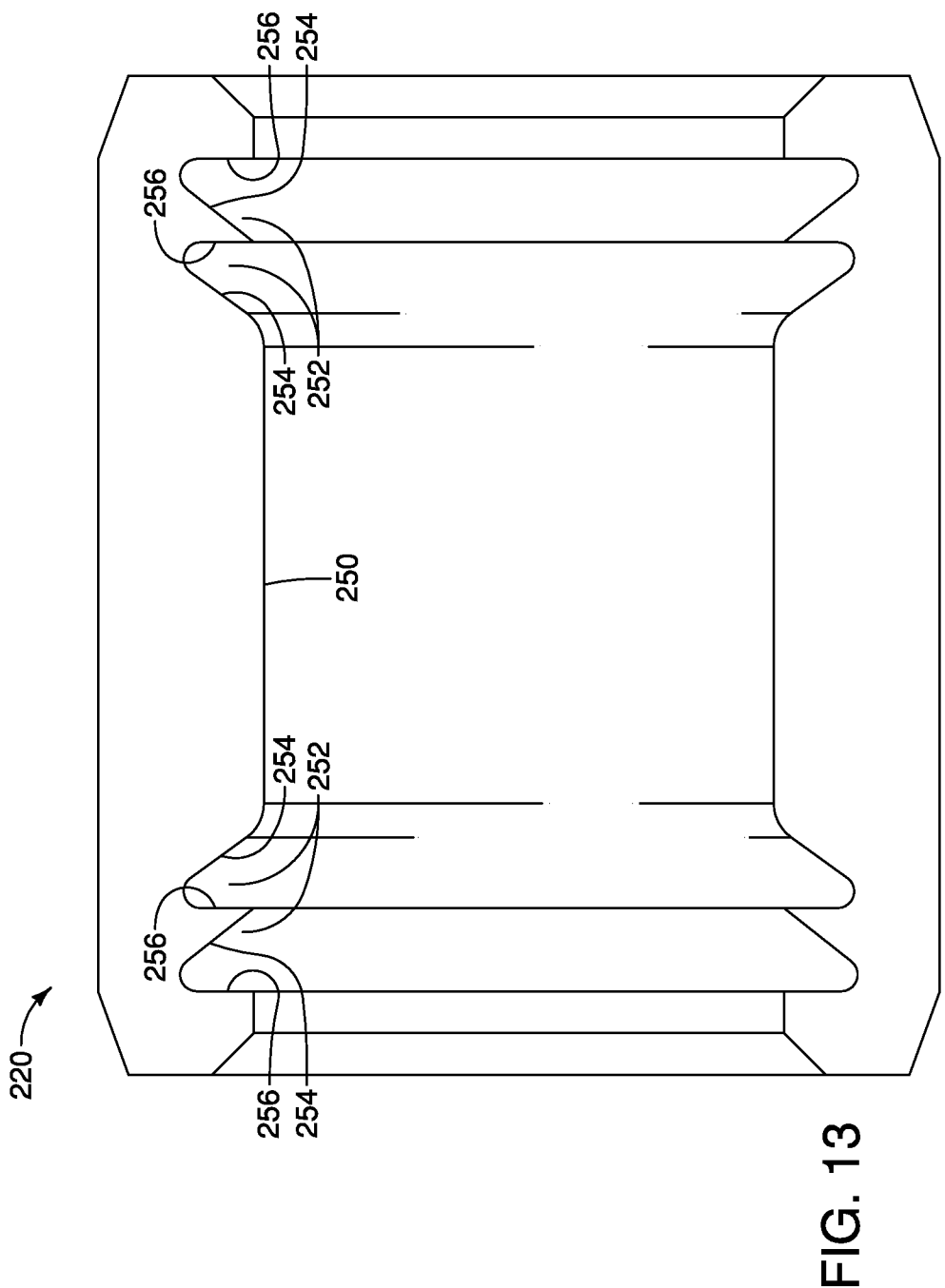
FIG. 13 is a cross-section taken generally through the center of bushings that are part of the counterweight mechanism shown in FIG. 10.
Figure 14:
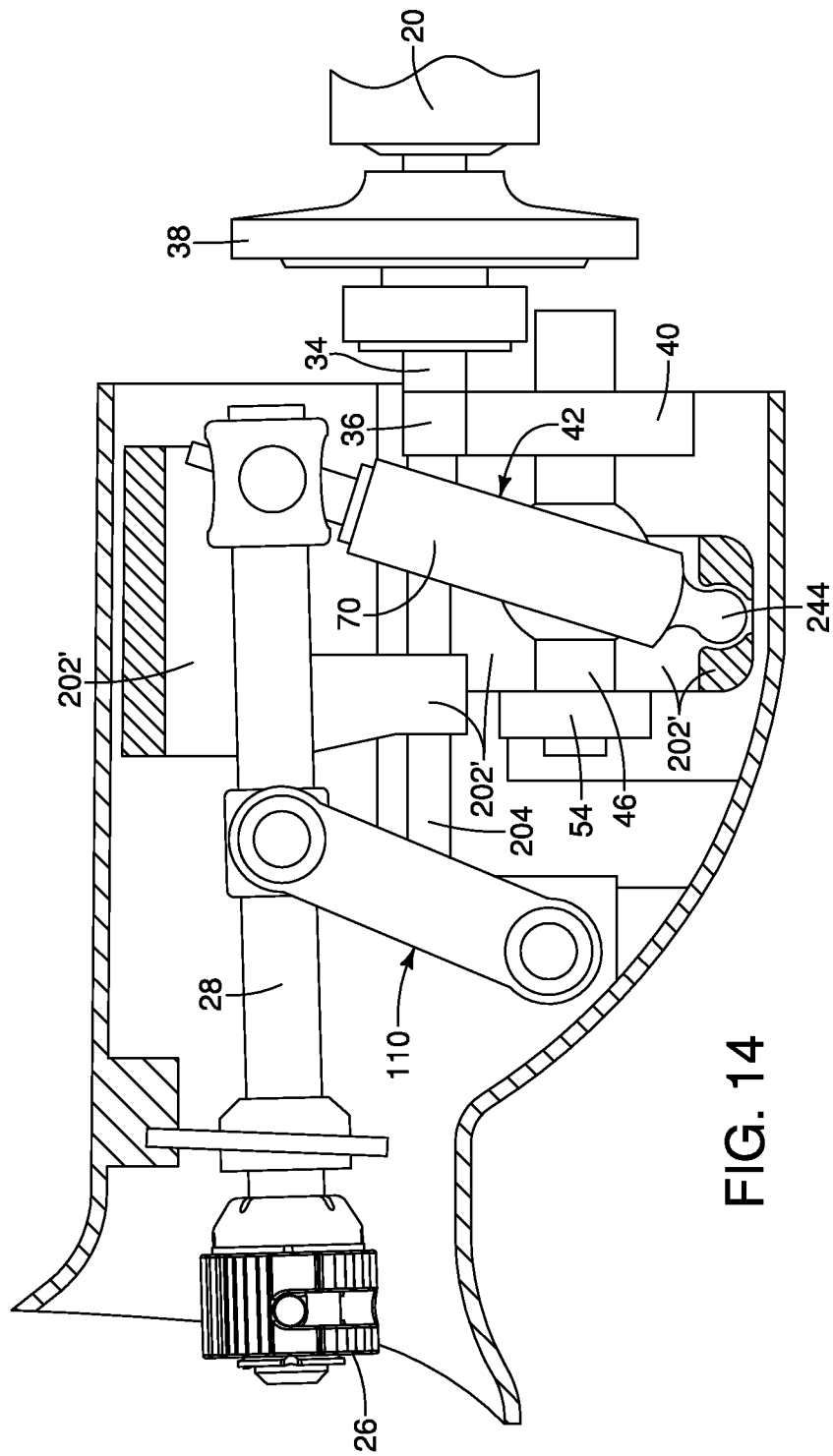
FIG. 14 is a plan view of a portion of the drive mechanism of a third preferred embodiment, partially in cross section, shown with a portion of a housing.

As is particularly shown in FIGS. 10 and 11, the second preferred embodiment is indicated generally at 200 and includes the drive mechanism that is similar to that shown in FIGS. 1-8, and in addition has a counterweight assembly, indicated generally at 202, which slides on a pair of rods 204, the near one of which is visible in the perspective view of FIG. 10. It should be understood that the far side of the counterweight assembly 202 is symmetrical with the visible near side shown in FIG. 10. In this regard, the counterweight assembly has a generally inverted U-shape top portion 206 that has downwardly extending side portions 208 that extend to enlarged mounting portions 210 which have a front portion 212 and a rear portion 214, as well as a center recess 216 which is cut away to expose the rod 204.

The front and rear portions 212 and 214 each have an aperture 218 which is sized to receive a bushing 220 and the inside diameter of the bushing 220 is sized to approximate the outside diameter of the rods 204 so as to provide a snug fit between the two. There are a total of four bushings used to facilitate sliding engagement of the counterweight assembly 202 on the rods 204.

Each of the recesses 216 preferably has a reservoir 222 that is sized larger than the diameter of the rod 204 and is preferably determined by the thickness of the bushing 220. A lower surface 224 is approximately co-extensive with the center of the rod 204. An important feature of this counterweight construction is that the recesses 216 define the reservoirs 222 which are located between the front and back bushings 220. These recesses 216 allow grease to be thrown in and accumulate in the reservoirs 222 as the counterweight reciprocates to lubricate the bushings 220. The recesses 216 also allow air flow which is created during the reciprocation of the counterweight assembly 202 to cool the bushings. The recesses 216 thereby help to reduce friction and wear in this important area during operation of the tool.

As is best shown in FIG. 10, the counterweight assembly 202 has a downwardly extending leg 226 that has a transverse extension 228 formed at the lower portion thereof. The transverse extension 228 has a vertically oriented slot 230 for receiving a connection to a drive rocker arm, indicated generally at 232, which has a center pivot 234 connected to the housing, and an upper arm portion 236 that is connected to the plunger 228 by a pivot connection 238.

The drive rocker arm 232 has a lower arm portion 240 with a lower pivot connection 242 that extends into the vertical slot 230 of the transverse extension 228 of the counterweight assembly 202. The drive rocker arm 232 effectively drives the reciprocation of the counterweight assembly 202 by virtue of the reciprocation of the plunger 28 when it is driven by the wobble drive 42. The bottom pivot connection 242 also slides within the vertical slot 240 to compensate for the slightly vertical movement that it makes during reciprocation of the rocker arm 232.

It should be understood that the counterweight 202 is driven from the bottom of the back drive rocker 232. Because the bottom arm portion 240 is long, the counterweight 202 is driven through a larger stroke. This is in comparison to a third preferred embodiment shown in FIG. 14 where the counterweight 202' is driven off of the bottom spherical knob 244 that is attached to the wobble arm 42. Therefore, the drive rocker arm 232 driving the counterweight is large than a system where the counterweight is driven off of the bottom of the wobble arm 42. Since the stroke is longer, the counterweight 202 can have less mass than one driven off of the bottom of the wobble and yet still provide the same counterbalancing force as a heavier counterweight moving through a smaller stroke.

Referring to FIG. 11, the pivot connection 238 which interconnects the upper arm portion 236 to the plunger 28 is only a fixed pivot and has no translation movement, which is also the case with respect to the forward guide rocker 110 and connection 126. The path of the plunger is determined by the two rocker arms 110 and 232. That being the case, the connection 76' is slightly modified from that shown in FIGS. 6, 7 and 8 in that the cylindrical end portion 72' must be slidable in its lengthwise direction in the arm 70. In such an instance, the washer 92 and nut 98 may be eliminated.

In addition to the feature of having the openings 216 and the reservoirs 222 allowing air flow as well as grease to be applied to the bushings, the bushings 220 are also configured to catch grease during movement of the counterweight 202 in one direction and then move toward the inside of the bushing during the opposite direction of reciprocation. This is achieved by an inside surface 250 having a pair of serrations 252 located at each end of the bushings 220, with the serrations having inwardly directed ramp portions 254 that merge with perpendicular end portions 256.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A reciprocating saw, comprising;
   a housing having at least one handle portion at a rear end of said housing;
   a drive shaft rotatably mounted in said housing;
   a motor in the housing for driving said drive shaft;
   an elongated plunger located in said housing for reciprocating motion in the lengthwise direction thereof and having a rear portion and a front end portion for attaching a cutting blade;
   an elongated guide rocker having an upper end portion with a first pivot connection to a mid portion of said plunger and a lower end portion with a second pivot connection to said housing, said first and second pivot connections maintaining an orientation of a plane of the blade substantially constant during said reciprocating motion;
   a wobble drive mechanism comprising a wobble drive shaft connected to said drive shaft, an elongated arm having a lengthwise axis extending upwardly from said wobble drive shaft, said arm having a third pivot connection to said plunger for reciprocating said plunger generally in a lengthwise direction thereof during alternating cutting and return strokes;
   a counterweight having a main portion that extends above and on opposite sides of said plunger and side portions that extend downwardly to said counterweight pivot connections;
   a support configuration associated with said counterweight and housing for supporting said counterweight while permitting reciprocating movement of said counterweight in said housing in a direction generally parallel to said plunger movement, said support configuration comprising a pair of spaced apart elongated rods oriented in a direction parallel to said lengthwise direction of said plunger and mounted in said housing, said counterweight having apertures in said side portions thereof in which said rods are inserted, said counterweight being movable relative to said rods.

2. A reciprocating saw as defined in claim 1 wherein said counterweight further comprises a lower portion interconnecting said side portions, said lower portion having a recess for engaging a rounded drive extension of said wobble drive mechanism for driving said counterweight.

3. A reciprocating saw as defined in claim 1 further comprising front and rear cylindrical bushings mounted in each of said side portions having openings of a predetermined diameter slightly less than the diameter of said rods, said side portions having an open recess therein between said front and rear bushings, with each recess having a reservoir beneath said rods for catching lubricating fluid therein during reciprocation of said counterweight.

4. A reciprocating saw as defined in claim 3 wherein said cylindrical bushings have at least one annular serration near at least one end portion thereof on the inside surface thereof for moving lubricating fluid toward the interior of said bushing.

5. A reciprocating saw as defined in claim 4 wherein said serrations have a two sided cross section with one side being oriented approximately at 90degrees relative to a center axis of said cylindrical bushing and a second side oriented at an angle of about 60 degrees relative to said center axis, with the second side being interior relative to the first side.

6. A reciprocating saw as defined in claim 5 further comprising at least two serrations on opposite ends of each bushing.

7. A reciprocating saw as defined in claim 1 wherein said upper pivot connection is configured to prevent translational movement of said plunger relative to said arm in the direction of said arm lengthwise axis.

8. A reciprocating saw as defined in claim 7 wherein said arm has a cylindrical end portion with a lower annular shoulder at the lower end thereof and a threaded outer end, said plunger is hollow and has an enlarged receiver portion with recess configured to receive said arm cylindrical end portion, said receiver portion having a transverse aperture oriented perpendicular to said cylindrical end portion, and said third pivot connection comprises a cylindrical shaft configured to rotatably fit within said transverse aperture, and said shaft having a generally centered aperture perpendicular to the axis thereof configured to receive said arm cylindrical end portion, and a nut threaded on said threaded outer end, said arm cylindrical end portion being rotatable in said centered aperture and said cylindrical shaft being rotatable in said receiver portion.

9. A reciprocating saw as defined in claim 8 wherein said cylindrical shaft has portions removed to provide flat portions adjacent to said nut and said shoulder of said arm.

10. A reciprocating saw as defined in claim 8 wherein said cylindrical shaft has at least one small aperture therein for communicating lubricating fluid to said centered aperture of said shaft.

11. A reciprocating saw as defined in claim 1 wherein said upper pivot connection is configured to permit translational movement of said plunger relative to said arm in the direction of said arm lengthwise axis.

12. A reciprocating saw as defined in claim 11 wherein said arm has a cylindrical end portion with a lower annular shoulder at the lower end thereof, said plunger is hollow and has an enlarged receiver portion with recess configured to receive said arm cylindrical end portion, said receiver portion having a transverse aperture oriented perpendicular to said cylindrical end portion, and said third pivot connection comprises a cylindrical shaft configured to rotatably and slidably fit within said transverse aperture, and said shaft having a generally centered aperture perpendicular to the axis thereof configured to receive said arm cylindrical end portion, said arm cylindrical end portion being rotatable and slidable in said centered aperture and said cylindrical shaft being rotatable in said receiver portion.

13. A reciprocating saw as defined in claim 1 further comprising an elongated counterweight rocker having an upper end portion with a fourth pivot connection to a back portion of said plunger rearwardly of said third pivot connection, a lower end portion having two spaced apart side walls, each side wall having a counterweight pivot connection for connection to a counterweight, and a housing pivot connection to said housing located between said upper and lower end portions.

14. A reciprocating saw as defined in claim 13 wherein said fourth pivot connection comprises a recess in said plunger in which said upper end portion of said counterweight rocker can be inserted and an aperture in said plunger perpendicular to said upper end portion of said counterweight rocker and a pin mounted in said aperture and said rocker to permit pivoting movement of said rocker relative to said plunger.

15. A reciprocating saw as defined in claim 13 wherein said counterweight pivot connection comprises a vertical slot in each of said side walls configured to receive a pin for connecting said counterweight to said lower end portion of said counterweight rocker and a pin mounted in said slot permitting pivoting and vertical sliding movement of said counterweight and said counterweight rocker.

* * * * *